United States Patent
Rosenau et al.

(10) Patent No.: US 9,412,131 B2
(45) Date of Patent: Aug. 9, 2016

(54) METHOD AND ARRANGEMENT FOR SPECIFYING SERVICES PROVIDED BY A FRANKING MACHINE

(75) Inventors: Dirk Rosenau, Berlin (DE); Clemens Heinrich, Oranienburg (DE); Kai Nicolai, Berlin (DE)

(73) Assignee: Francotyp-Postalia GmbH, Birkenwerder (DE)

(*) Notice: Subject to any disclaimer, the term of this patent is extended or adjusted under 35 U.S.C. 154(b) by 1018 days.

(21) Appl. No.: 13/533,381

(22) Filed: Jun. 26, 2012

(65) Prior Publication Data
US 2013/0346293 A1 Dec. 26, 2013

(51) Int. Cl.
*G06Q 50/00* (2012.01)
*G06Q 40/00* (2012.01)
*G06Q 10/00* (2012.01)
G06F 17/00 (2006.01)
G07B 17/02 (2006.01)

(52) U.S. Cl.
CPC ............... *G06Q 40/00* (2013.01); *G06Q 10/00* (2013.01)

(58) Field of Classification Search
CPC ............ G07B 17/00733; G07B 2017/00967; G07B 2017/00201; G07B 2017/00169
See application file for complete search history.

(56) References Cited

U.S. PATENT DOCUMENTS

| 6,009,417 | A | * | 12/1999 | Brookner | G07B 17/0008 235/375 |
|---|---|---|---|---|---|
| 6,098,058 | A | * | 8/2000 | Gravell | G07B 17/0008 705/410 |
| 2007/0005507 | A1 | * | 1/2007 | Chatte | G07B 17/0008 705/62 |
| 2007/0276761 | A1 | * | 11/2007 | Meyer | G06Q 20/3674 705/60 |
| 2008/0301387 | A1 | * | 12/2008 | Heinrich | G07B 17/0008 711/162 |
| 2009/0119219 | A1 | * | 5/2009 | Bleumer | G07B 17/00733 705/62 |
| 2010/0235303 | A1 | | 9/2010 | Lynch | |

* cited by examiner

*Primary Examiner* — George Chen
(74) *Attorney, Agent, or Firm* — Schiff Hardin LLP (57) ABSTRACT

In a method for specifying services provided by a franking machine, a program code is loaded into a data processing device via and, a first communication channel to a remote data center, authorization to access the franking machine is requested using an authorization request message. In response, via a second communication channel, data are provided from the remote data center to the franking machine. In response, the franking machine enables access for executing a specification process via a third communication channel via which communication between the data processing device and the franking machine is established using the program code executed by the data processing device. The specification process is executed using the program code to set at least one feature of at least one service provided by the franking machine.

27 Claims, 2 Drawing Sheets

METHOD AND ARRANGEMENT FOR SPECIFYING SERVICES PROVIDED BY A FRANKING MACHINE

BACKGROUND OF THE INVENTION

1. Field of the Invention

The present invention relates to a method for specifying services provided by a franking machine. It furthermore concerns relates to a corresponding arrangement for specifying services provided by a franking machine, corresponding components of said arrangement as well as to a computer readable medium comprising program code for executing at least part of the method according to the invention in such an arrangement.

2. Description of the Prior Art

In the presently used postal transport systems, such as they are known, for example, from US 2010/0235303 A1 (Lynch; the entire disclosure of which is incorporated herein by reference), the mail items (such as letters, packages, parcels etc.) are typically provided with a value marking or a corresponding franking imprint (in the following generally referred to herein as an indicium) that, among other things, serves as evidence for the payment of the necessary transport fees of the selected postal carrier. For this purpose, the value marking or the franking imprint normally contains a series of graphical verification features, for example alphanumeric characters, barcodes etc. that contain indicium information in coded or uncoded form. This information enables it to be determined whether the transport fees have been paid.

After the mail item has been transferred to the postal carrier, the carrier uses the indicium to verify whether the fees necessary for the transport have been paid. If the verification is successful, the postal carrier takes over the transport of the mail piece to the desired location; otherwise, it rejects the item (if applicable).

In many cases so called franking machines integrating a postal security device, a data processing unit and, in some cases, also a printing unit, are used to generate the indicium on a substrate such as the mail piece itself or a label to be connected to the mail piece. In some cases however, separate data processing devices, such as personal computers (PCs) or the like, are used are used to perform parts of the indicium generation for several reasons.

One of these reasons is the limited data processing capacity of special purpose data processing units such as the postal security devices of franking machines. Specific software run on a conventional PC connected to such a postal security device (e.g. of a franking machine) helps tracking and optimizing a customer's mail and postage costs and leverages the customer to take advantage of discounts offered with commercial postage products.

For example, Francotyp Postalia GmbH of Birkenwerder, DE, has released a software called Mailone™ supporting a customer in claiming discounted Commercial Base Pricing (CBP) by printing a delivery confirmation barcode and sending the CBP data to a postal carrier such United States Postal Service (USPS). The Mailone™ software runs on a customer's PC that is connected to a postal security device of a separate franking machine and to a label printer for printing the indicium. The customer's PC receives indicium data from the postal security device and causes the label printer to print a representation of the indicium onto a label which is then connected to the mail piece to be shipped.

It will be appreciated that, in such a configuration with a data processing device (such as a PC) receiving indicium data from a separate postal security device, in cases where there is no secure connection between the data processing device and the postal security device, fraudulent indicium data might be transferred to and printed via the data processing device by an external device simulating to be a valid postal security device. Such a fraudulent simulation might be performed subsequent to an attack unveiling the communication protocol between the data processing device and a valid separate postal security device. By this means, mail pieces with fraudulent indicia might be entered into the mail stream of a carrier forcing the latter to implement a sufficiently high survey ratio of the indicia of its mail stream to prevent undetected fraud.

A further reason for using separate data processing devices in generating printed indicia is the greater flexibility of the user interface provided by such separate data processing devices (e.g. PCs) compared to the user interface typically provided by such franking machines. Hence, with such external or separate data processing devices, typically, more user convenient menus may be displayed and data entry is also rendered more user-friendly.

However, as outlined above, the use of such devices external to the franking machine brings along commercial as well as security problems, for example, when using unauthorized our outdated software which doesn't correspond to the actual requirements of the postal carrier.

Hence, there is a need to be able to specify the services provided by a franking machine to such devices external to the franking machine while at the same time keeping a sufficiently high level of security.

SUMMARY OF THE INVENTION

An object of the present invention is to provide a method and an arrangement for specifying services provided by a franking machine that, at least to a certain extent overcome the above disadvantages, and which in particular keep a sufficiently high level of security.

The present invention is based on the insight that a simple and convenient way of specifying services provided by a franking machine keeping a sufficiently high level of security is possible if access to execution of the services provided by the franking machine is limited using a specification process for specifying one or more services of the franking machine provided to an external data processing device, in which access to the specification process involves communication between a user of the data processing device or the data processing device itself with a remote data center as well as communication between the franking machine and the remote data center via suitable communication channels.

It should be noted that, in particular, communication between a user of the external data processing device and a remote data center doesn't have to happen in exclusively electronic way. For example, a communication channel at least partially established by regular mail or telephone between the user and the remote data center may also be used. Furthermore, any other communication means from a communication device other than the data processing device may be used, such as e-mail, for example. However, the first communication channel may also be a purely electronic channel formed by a communication link between the data processing device and the remote data center.

The same applies to the second communication channel between the remote data center and the franking machine. Preferably, however, the second communication channel is an electronic communication link between the data center and the franking machine, since, typically, such a (typically secured) communication link is available anyway for conventional franking machine.

Such communication with remote data center allows simple introduction of security features into both the data processing device and the franking machine enhancing security of the whole process. In particular, neither the external data processing device nor the franking machine have to be provided with such security features from the very beginning, thereby rendering the whole system more flexible.

Hence, according to a first aspect of the present invention, there is provided a method for specifying services provided by a franking machine, having, in a program code loading step, loading a program code into a data processing device. In an authorization request step, via a first communication channel to a remote data center, authorization to access the franking machine is requested using an authorization request message. In an authorization step, in response to the authorization request message, via a second communication channel between the remote data center and the franking machine, authorization data are provided from the remote data center to the franking machine. The franking machine, in an access activating step, in response to receipt of the authorization data, enables access to the franking machine for executing a specification process via a third communication channel between the data processing device and the franking machine. In an access step, communication between the data processing device and the franking machine is established via the third communication channel using the program code executed by the data processing device. In a specification step, executing the specification process using the program code executed by the data processing device, the specification process sets at least one feature of at least one service provided by the franking machine.

It will be appreciated that any type of service may be set, configured or modified according to arbitrary criteria. With particularly beneficial embodiments of the invention, functionality of the franking machine is expanded beyond what is available using the user interface of the franking machine. Hence, preferably, the franking machine has a user interface for controlling operation of the franking machine, the specification process being unavailable using the user interface of the franking machine. By this means, functionality of the whole system may be greatly expanded and rendered more variable, respectively.

The service specified with the method according to the invention may be a service immediately providing at the franking machine the result of a desired action initiated by the user of the data processing device. For example, it may be the printing of an indicium onto a substrate, such as a letter. Preferably, in a service executing step, the data processing device (when executing the program code) executes a further service, for example, requested by the user of the data processing device entering corresponding request data when running a specific request routine of the program code. Executing the further service then comprises requesting the service from the franking machine. Hence, functionality of the franking machine may be further expanded to further services where the service provided by the franking machine represents only a part of the further service or a contribution to the further service executed by the data processing device As mentioned, any type of service (the franking machine is able to provide) may be the object of the specification process. Preferably, executing the specification process using the program code executed by the data processing device comprises setting at least one feature of at least one service provided by the franking machine selected from a specific service group.

A member of the service group is a service providing input data for a franking product selection process executed using the program code. Hence, selection of the desired franking product may be executed on the basis of data provided by the franking machine to the data processing device.

A further member of the service group is a service providing input data for a logging process executed using the program code. Hence, logging and/or statistics functionality may be implemented in the program code executed by the data processing device, this logging and/or statistics functionality receiving relevant input data (relating to services performed by the franking machine) from the franking machine in the course or as a result of this service.

A further member of the service group is a service providing input data for a reporting process executed using the program code. Hence, reporting functionality may be implemented in the program code executed by the data processing device, this reporting functionality receiving relevant input data (relating to services performed by the franking machine) from the franking machine in the course or as a result of this service. Provision of such reporting data to a remote facility, such as the remote data center or a further remote data center (e.g. a remote data center of a postal carrier) may be the basis for specific discounts in generating a postal indicium. Hence, functionality of the franking system and, moreover, benefit of the use of such a franking system to both the postal carrier and the user of the franking system may be easily enhanced.

A further member of the service group is a service receiving output data of a franking product selection process executed using the program code. Hence, for example, the franking product selection process may be performed in a more convenient or flexible way using the data processing device, the service executed by the franking machine then receiving corresponding input data and, for example, in response to receipt of these input data generating a franking imprint.

A further member of the service group is a service printing an image onto a substrate, the image including at least one of graphics, human readable text and machine readable information. With such a service is possible, for example, to modify at least parts of the image to be printed using the external data processing device. For example, the external data processing device may be used to modify information content of the image printed, such as by (arbitrarily) editing a human readable text string printed in the image.

A further member of the service group is a service outputting printing information for a printing process executed using the program code. Hence, for example, is possible to provide a service that generates at least part of the printing information necessary in generating a printed indicium using a printer connected to the data processing device (instead of the printer module of the franking machine).

Preferably, the printing information outputted by the franking machine comprises security or accounting relevant data. Preferably, at least part of the printing information up at the by the franking machine is secured using the security features of a security device of the franking machine. Typically, such security devices provide security features including the use of cryptographic means (such as generation of message authentication codes, data encryption, generation of digital signatures, generation of digital certificates etc.).

Here again, it is possible to expand the functionality of the franking system by providing more convenient printing functionality, in particular printing functionality easily able to print larger images or printing with conventional ink or toner compared to printing modules used in franking machines (typically also requiring specific postal ink).

A further member of the service group is a service generating accounting information for a printing process executed using at least one of the program code and the franking machine. Hence, with the present invention it is possible to switch from a conventional postage payment system to a more enhanced postage payment system providing specific discounts to the user under certain predefined prerequisites.

A further member of the service group is a service generating accounting information for execution of a further service using at least one of the program code and the franking machine. Hence, it is also possible to expand accounting facilities of the franking machine to the execution of further services (other than accounting for the generation of indicium data).

A further member of the service group is a service triggering execution of a further service by said franking machine. Hence, it is also possible, for example, to specify a service initiating communication of said franking machine with a remote facility (e.g. the remote data center or another data center). Such a service may, for example, be a service requesting refill of accounting registers of a security device of the franking machine, a service requesting a software update or a firmware update for said franking machine, a service sending diagnosis data (representing a status of one or more components of the franking machine) of the franking machine to the remote facility.

Finally, a further member of the service group is a service configuring operation of said franking machine. Hence, it is also possible, for example, to specify a service providing IP settings, an accounting administration service providing setup and/or modification of accounting related user accounts (e.g. administration of individual budgets, user accounts, account limit warnings etc.), a service providing user interface administration (e.g. programming of softkeys, defining bookmarks, modifying menu structure or menu sequence etc.).

It will be appreciated that arbitrary features of the respective service may be set in the specification process. Preferably, at least one feature set is selected from a specific feature group.

A member of this feature group is an accessibility of the service to the data processing device executing the program code. Hence, the most simple case, setting the featuring the specification process simply defined if the respective service is available or accessible, respectively, at all.

A further member of this feature group is an information content of the service. Hence, for example, specific messages or content input or output in the course of this service may be modified. As a consequence, for example, a text string output (e.g. printed in an indicium) may be edited and modified, respectively, in the course of the specification process.

Further members of the feature group are a number of service steps of the service, a combination of service steps of the service and a sequence of service steps of the service. By this means, the combination of certain service steps as well as their sequence within the service may be readily modified according to the invention. Finally, a further member of the feature group is a scope of at least one service step of the service. Hence, the specific outcome of the service may be modified.

Authorization to access and execute the specification process may be provided in a general way, i.e. may either be provided or not without any limitation. However, with certain embodiments of the invention, a more sophisticated differentiation is realized in the level or extent of authorization. Hence, preferably, in the authorization step, the remote data center provides one of positive authorization data and negative authorization data to the franking machine. The positive authorization data are provided if a payment transaction representing payment for executing the authorization step has been successfully completed, while the negative authorization data are provided if the payment transaction has not been successfully completed. The franking machine, in the access activating step, in response to receipt of the positive authorization data, enables access to the franking machine for executing the specification process up to the occurrence of a first event. Furthermore, the franking machine, in the access activating step, in response to receipt of the negative authorization data, either keeps access disabled or enables access to the franking machine for executing the specification process up to the occurrence of a second event, the second event being different from the first event. By this means, for example, in case of the positive authorization data, full and permanent access to the specification process may be granted. Contrary to that, in case of the negative authorization data, limited access to the specification process may granted.

The first and second event may be any desired temporal and non-temporal event. For example, it is possible to limit access to the specification process for certain amount of time or a certain amount of usage of the specification process. Furthermore, provided that no payment has been effective so far, a test access may be granted for a certain amount of time or a certain amount of usages.

Access control of the data processing device to the franking machine may in principle be performed in arbitrary suitable ways. Preferably, the franking machine has a communication interface for establishing the third communication channel, the franking machine, in the access activating step, activating the communication interface for establishing the third communication channel if the authorization data have a predetermined content, otherwise keeping the communication interface inactive. Hence, in a very simple manner, access to the franking machine may, for example, simply be controlled by the franking machine simply ignoring the communication interface as long as no activation has taken place.

Preferably, in the authorization step, in response to the authorization request message, the remote data center provides a first secret to the data processing device and a second secret to the franking machine. The franking machine, in the access step, receives an authorization message from the data processing device executing the program code, the authorization message comprising the first secret. The franking machine, in the access step, performs a check using the authorization message, the franking machine, in response to a result of the check using the authorization message, enabling execution of the specification process only if a predetermined relationship exists between the first secret and the second secret. By this means it is possible to implement, in a very simple way, a higher security level using the communication of both parties (data processing device and franking machine) with the remote data center.

It will be appreciated here as well, that providing the first and second secret may ensue by any suitable communication channel. In particular, again, the first and second communication channels as outlined above may be used.

It will be further appreciated that such an approach may be taken for more security relevant services to be executed using the system. For example, such an approach will preferably be taken in cases where accounting and/or secure data generation services provided by the franking machine (more precisely the security device of the franking machine) are used as parts a further service performed using the program code executed by the data processing device.

The first and second secret may be of any desired type. In any case they are of sufficient length to prevent easy compromise of the respective secret. Preferably, the first secret comprises at least one secret component selected from a secret component group, the secret component group consisting of constant secret data and user secret data unique to a specific user of the data processing device initiating the authorization request step. By this means, using the constant secret data secrets for a specific class of data processing devices franking machines etc. may be set up. Moreover, using the user specific user secret data, individual and unique secrets for each user may be set up.

The first and second secret may be used in any desired way to provide enhanced security of arbitrary parts of the method. Preferably, the data processing device and the franking machine, in the access step, establish a shared secret using at least one of the first secret and the second secret. The shared secret then is used to cryptographically secure communication between the data processing device and the franking machine via the third communication channel. By this means, fraudulent attacks to the communication between the data processing device and the franking machine may be effectively prevented.

As mentioned above, arbitrary parts of the service may be configured or modified in the specification process. Preferably, in the specification step, executing the specification process using the program code executed by the data processing device comprises modification of the at least one service from a first service variant to a second service variant, the first service variant being enabled prior to executing the specification process, the second service variant being enabled after executing the specification process. By this means it is possible, for example, to simply switch between or activate certain variants of a service implemented within the franking machine.

Such a switch may be used for arbitrary services. Preferably, the service provided by the franking machine comprises an accounting service, the accounting service, in the first service variant, providing different accounting for execution of the service than in the second service variant. Hence, for example, a switch between variants of the accounting service providing different discounts to a user of the system may be achieved in a very simple manner.

As also mentioned above, with a certain preferred embodiments of the invention, the service provided by the franking machine comprises a service outputting printing information for a printing process executed using the program code, the data processing device, using the program code, then causing generation of an imprint on a substrate via a printing device connected to the data processing device. By this means it is possible to expand in a secure way printing functionality of the system to print images which may not be printed using the printing module of the franking machine.

Preferably, the printing information comprises postal indicium data, the postal indicium data being generated as a part of the service by a security device of the franking machine in response to indicium request data received from the data processing device executing the program code.

Preferably, at least a part of the postal indicium data is secured by the security device of the franking machine using cryptographic means selected from a cryptographic means group, the cryptographic means group consisting of use of encryption, use of a digital signature and use of a message authentication code and use of a digital certificate.

Furthermore, preferably, the service provided by the franking machine comprises an accounting service accounting for outputting the printing information, the accounting service being executed by a security device of the franking machine.

With certain embodiments of the present invention, in the access step, at least one of a program code authentication step and a franking machine authentication step is performed. In the program code authentication step, the franking machine performs an analysis of a program code authentication message received from the data processing device; the franking machine enabling execution of the specification process as a function of a result of the analysis of the program code authentication message. By this means it may be guaranteed that the franking machine only enables execution of the specification process if a proper program code is used within the data processing device. Hence, the use of outdated or unauthorized program code may be easily prevented by this means.

Furthermore, in the franking machine authentication step, the data processing device using the program code performs an analysis of a franking machine authentication message received from the franking machine, the data processing device enabling execution of the specification process as a function of a result of the analysis of the franking machine authentication message. By this means it may be guaranteed that the data processing device only enables execution of the specification process if communication with a properly configured franking machine is established.

It will be appreciated that any desired criteria for the analysis of the respective authentication message may be defined. Preferably, the program code authentication message comprises an identification of the program code, the identification of the program code being representative of at least one of a type of the program code, a version identifier of the program code, and a unique identifier of the program code, an identifier of a first data set used by the program code. Hence, one or more of these items may be part of the analysis to establish proper configuration of the program code suitable for cooperating with the franking machine in its present configuration.

Similarly, preferably, the franking machine authentication message comprises an identification of the franking machine, the identification of the franking machine being representative of at least one of a type of the franking machine, an operating system version of the franking machine, a unique identifier of the franking machine, and an identifier of a second data set used by the program code. Hence, here as well, one or more of these items may be part of the analysis to establish proper configuration of the franking machine suitable for cooperating with the program code in its present configuration.

It will be appreciated, for example, that it may be checked in this context, if the appropriate, most recent version of the program code is present in the data processing device which matches the actual software configuration of the franking machine and vice versa. Furthermore, if postal services are performed requiring the use of postal information such as rate tables or the like, it can be established if both the data processing device and the franking machine hold the same valid or applicable rate table.

It will be appreciated that, in any case of a mismatch, the communication partner holding inappropriate data may be triggered or even forced to obtain an update of these data. Hence, particularly stable configurations may be achieved using compatible and/or continuously updated data on both the data processing device and the franking machine.

It will be appreciated that a one-time execution of at least one of the program code authentication step and the franking machine authentication step may be sufficient. Preferably, however, at least one of the program code authentication step and the franking machine authentication step is performed at the occurrence of at least one predetermined event selected from a specific event group. The event group preferably consists of the occurrence of a predetermined temporal event, the occurrence of a predetermined non-temporal event, the occurrence of an n-th execution of the access step (where n is an arbitrary integer starting at n=1), the occurrence of a predetermined point in time, the lapse of a predetermined time interval from the last occurrence of an event of the event group. Preferably, the event is the occurrence of an access step, i.e. with each access step least one of the program code authentication step and the franking machine authentication step is performed, such that process insecurity due to software incompatibility is reduced to a minimum.

It will be appreciated that one single level of security may be provided, i.e. that only one level of authorization is selected. However, preferably, different levels of authorization and security, respectively, may be implemented. Hence, for example, on a lower level of security or authorization, respectively, specification of certain non or less security relevant first services may be provided, while specification of more security critical second services may be enabled only if a higher level of security or authorization, respectively, has been established.

Thus, preferably, with certain embodiments of the invention, the authorization step is a first authorization step, the authorization data being first authorization data, and the specification step is a first specification step, the specification process being a first specification process. In this case, the franking machine, in the access activating step, in response to receipt of the first authorization data provided in the first authorization step, enables access to the franking machine for executing the first specification process. The first specification process executed in the first specification step enables execution of at least one first service requested by the data processing device executing the program code from the franking machine.

In a further authorization request step, via the first communication channel to the remote data center, authorization to access at least one second service of the franking machine is requested using a second authorization request message. In a second authorization step, in response to the second authorization request message, via the second communication channel second authorization data is provided from the remote data center to the franking machine. The franking machine, in a second access activating step, in response to receipt of the second authorization data, enables access to the franking machine for executing a second specification process via the third communication channel. In a second specification step, the second specification process is executed using the program code executed by the data processing device, the second specification process setting at least one feature of at least one second service provided by the franking machine.

Similar to the process outlined above, with certain preferred embodiments of the invention, in the second authorization step, in response to the second authorization request message, the remote data center provides a first secret to the data processing device and a second secret to the franking machine. The franking machine, in the second access step, receives a second authorization message from the data processing device executing the program code, the second authorization message comprising the first secret. The franking machine, in the second access step, performs a check using the second authorization message. Furthermore, the franking machine, in response to a result of the check using the second authorization message, enables execution of the second specification process only if a predetermined relationship exists between the first secret and the second secret.

It will be appreciated that for any communication used with the present invention, any desired and suitable type of communication channel may be used. Preferably, communication providing a providing a sufficiently high level of data security and data integrity is used. Preferably, communication over at least one of the first communication channel, the second communication channel and the third communication channel is secured by cryptographic means selected from a cryptographic means group, the cryptographic means group consisting of use of encryption, use of a digital signature, use of a digital certificate and use of a message authentication code.

Furthermore, preferably, at least one of the first communication channel and the second communication channel is established via a data network, while the third communication channel is at least one of a point-to-point communication link and a USB link. While the point-to-point communication over the third communication channel already provides some kind of increase in the security level of the communication, data network communication obviously increases the flexibility of the system.

It will be appreciated that the respective authorization request message may be generated and conveyed to be remote data center by any suitable means. For example, it may be contained in a simple letter or handwritten form sent by ordinary mail to the operator of the data center, the request message than being transferred from the letter to the data center.

With certain embodiments of the invention, the authorization request message is generated using the program code executed by said data processing device. Then, in the authorization request step, a first communication channel is established via a communication link between the data processing device and the remote data center, the authorization request message being transmitted to the data center via the communication link.

Similar applies with further embodiments of the invention using the first and second secrets, where in the authorization step, the first communication channel is established via a communication link between the data processing device and the remote data center, the first secret then being provided to the data processing device via the first communication channel.

The present invention further relates to a data processing arrangement adapted to execute a method for specifying services provided by a franking machine, preferably a method according to the invention. The data processing arrangement indicates a data processing device, a franking machine and a remote data center. The data processing device is configured to load, in a program code loading step, a program code. The remote data center is configured to receive, in an authorization request step, via a first communication channel, an authorization request message for providing authorization to access said franking machine. The remote data center is configured to provide, in an authorization step, in response to the authorization request message, via a second communication channel between the remote data center and the franking machine, authorization data from the remote data center to the franking machine. The franking machine is configured to enable, in an access activating step, in response to receipt of the authorization data, access to the franking machine for executing a specification process via a third communication channel between the data processing device and the franking machine. The data processing device and the franking machine are configured to establish, in an access step, communication between the data processing device and the franking machine via the third communication channel using the program code executed by the data processing device. The data processing device and the franking machine are configured to execute, in a specification step, the specification process using the program code executed by the data processing device, the specification process setting at least one feature of at least one service provided by the franking machine.

The embodiments and advantages as outlined above in the context of the method according to the invention may be obtained here to the same extent. Hence, in this respect reference is made to the explanations given above.

The present invention further relates to a data processing device being configured as the data processing device of such an arrangement according to the invention. The present invention further relates to a franking machine being configured as the franking machine such an arrangement according to the invention. The present invention further relates to a remote data center being configured as the remote data center of such an arrangement according to the invention.

The embodiments and advantages as outlined above in the context of the method according to the invention may be obtained to the same extent with such a processing device, such a franking machine and such a remote data center. Hence, in this respect reference is made to the explanations given above.

Finally, the present invention relates to a non-transitory computer-readable storage medium embodying program code adapted to control execution of at least a part of the method according to the invention. It will be appreciated that with this program code contained in such a computer readable medium and run on a suitable data processing device, the variants and advantages of the method is outlined above may be achieved to the same extent such that reference is made to the explanations given above in the context of the method according to the invention.

DESCRIPTION OF THE PREFERRED EMBODIMENTS

In the following, a preferred embodiment of an arrangement 101 adapted to execute a preferred embodiment of the method for specifying services provided by a franking machine 102 according to the invention will be described in greater detail with reference to FIGS. 1 and 2.

Figure 1:
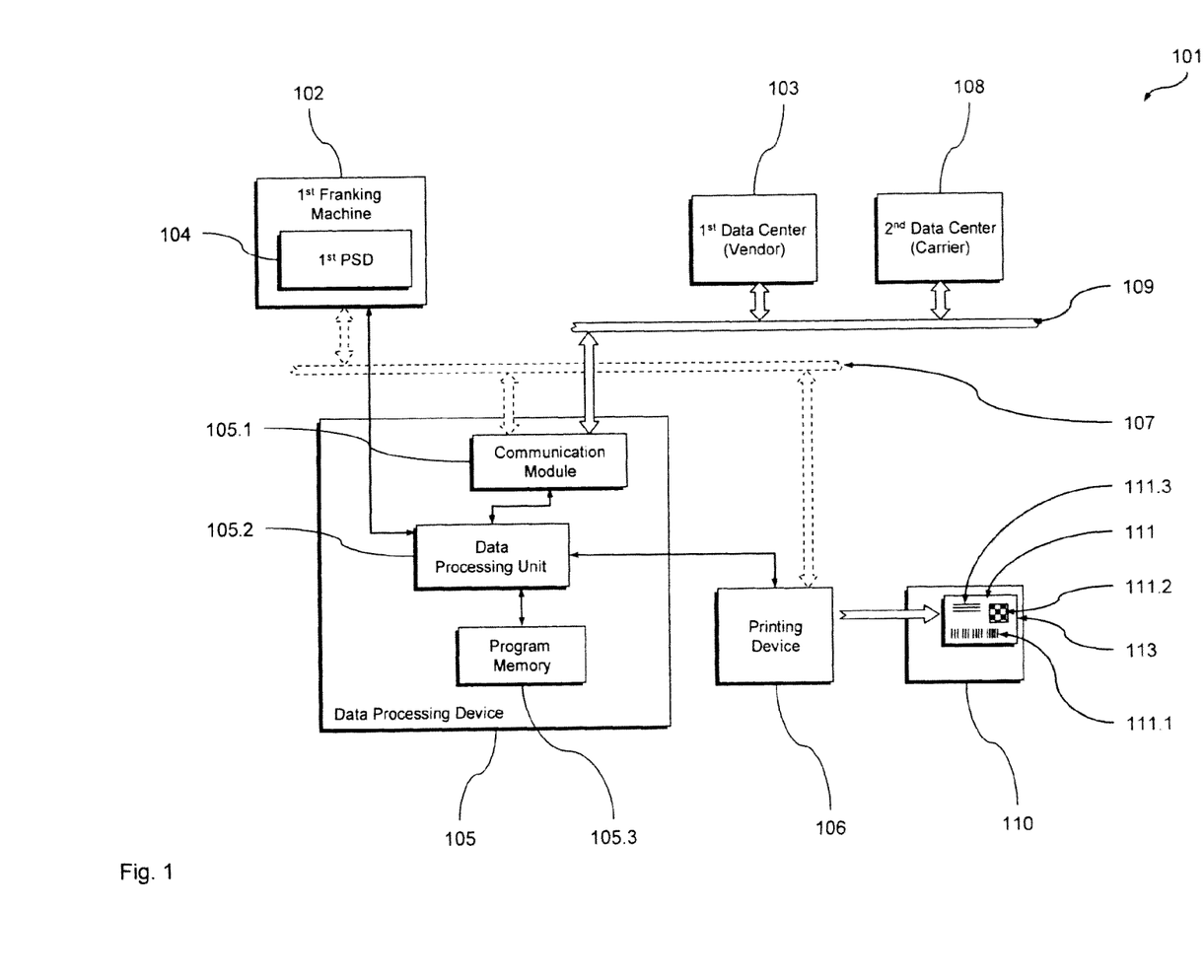
FIG. 1 is a block diagram of a preferred embodiment of the arrangement for specifying services provided by a franking machine using which a preferred embodiment of the method for specifying services provided by a franking machine according to the invention may be executed.
Figure 2:
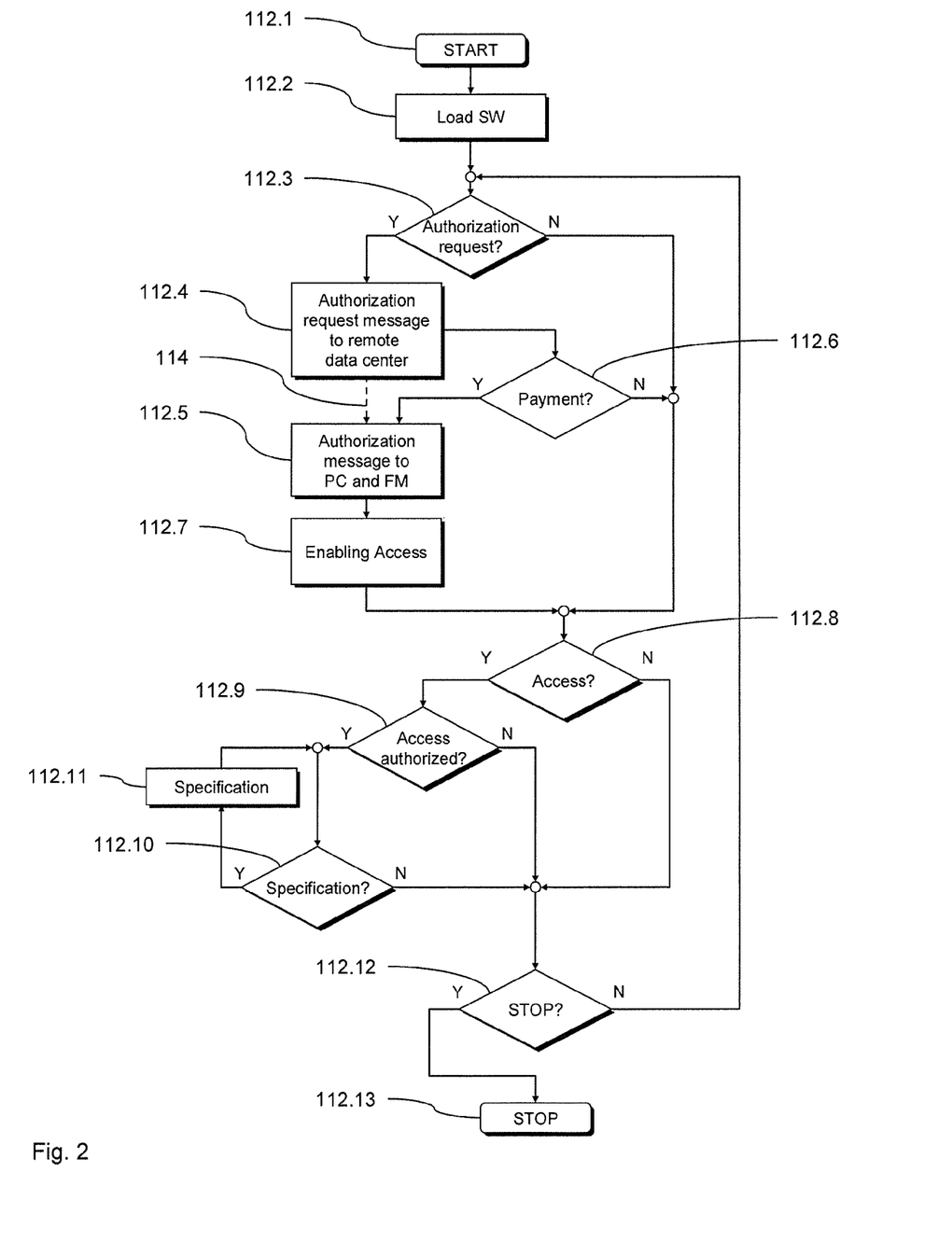
FIG. 2 is a block diagram of the method for specifying services provided by a franking machine executed with the arrangement of FIG. 1.

As can be seen from FIG. 1 the arrangement 101 comprises remote data center 103 (operated by a vendor of the franking machine 102), the franking machine 102 with a postal security device (PSD) 104, a data processing device 105 and a printing device 106. The franking machine 102 and the printing device 106, in the present embodiment, are both connected directly to the data processing device 105 via a point-to-point connection, such as a USB connection or the like.

It will be appreciated however that, with other embodiments of the invention, either one of the franking machine 102 and the printing device 106 may be connected to the data processing device via a data network, such as e.g. a local area network (LAN), as it is indicated in FIG. 1 by the dashed contour 107.

In the present embodiment, the arrangement 101 comprises a further remote data center, namely a carrier data center 108 (operated by a postal carrier intended to ship mail pieces 109). Both data centers 103, 108 are located remote from the data processing device 105 and may be connected to the data processing device 105 via a communication module 105.1 of the data processing device 105 and a further data network 109 (such as, for example, a wide area network as e.g. the Internet, or a telecommunication network).

The franking machine 102 may be a conventional franking machine used to generate franking imprints either directly on a mail piece (such as a letter or the like) or on a label which is to be associated to a mail piece (e.g. to be connected to a parcel or the like).

The postal security device 104 may be a physically and/or logically secured data processing unit providing, in a conventional manner, among others, data security functionality to secure certain data, in particular, accounting relevant data, from unauthorized and/or undetected access. To this end, one or more cryptographic functions (including the appliance of one or more cryptographic algorithms as well as one or more cryptographic keys) may be implemented within the postal security device 104. It will be appreciated that any further postal security device mentioned in the following may be configured in such a manner.

The data processing device 105, in the present example, is formed by a personal computer (PC) and comprises a data processing unit in the form of a central processing unit (CPU) 105.2 connected to a program memory 105.3 holding a program code. The data processing unit 105.2 is running this program code to provide and execute the functionality of the data processing device 105 as it will be explained in the following.

The program code provided in the program memory 105.3, among others, comprises a mailing software (such as, for example, a software called Mailone™ issued by Francotyp Postalia GmbH of Birkenwerder, DE) or program code MS supporting a user of the franking machine 102 in providing statistical data regarding the mail pieces 110 processed to the carrier intended to ship the mail pieces 110 in order to obtain rebates or discounts, respectively, from the carrier. For example, this software may support the user in claiming so-called discounted Commercial Base Pricing (CBP) by printing a delivery confirmation (one-dimensional) barcode 111.1 as a part of a printed indicium 111 (representing CBP data) and sending corresponding CBP data to the postal carrier (such as e.g. the United States Postal Service).

The program code provided in the program memory 105.3, among others, may be adapted to protect data stored in the memory 105.3 or, if need be, in another memory connected to the central processing unit (CPU), e.g. a memory holding a database comprising such data to be protected. The protected data may encompass, among others, the CBP reporting data, event logging data and other data. In the present example, the data to be protected are held in a database to which the central processing unit (CPU) has access.

To protect this data the database itself is encrypted using a suitable encryption mechanism. The database may, for example, be a Microsoft® Access® 2007 database and the encryption mechanism used may be the encryption mechanism built in to the Microsoft® Access® database. The cryptographic key DBEK used for the encryption of the database is preferably hidden in the source code of the mailing software. To this end, a suitable software tool (typically a so called obfuscator) may be used to obfuscate the source code of the mailing software and makes it very difficult to locate the cryptographic key DBEK.

As will be explained in the following with reference to FIGS. 1 and 2, the mailing software may be used to specify services provided by the franking machine, while at the same time maintaining a high level of security in doing so.

In a step 112.1 the routine is started. Then, in a program code loading step 112.2, the program code MS representing the mailing software is loaded into the program memory 104.3 of the data processing device 105.

In a step 112.3 a check is made if an authorization request is received at said data center 103. If this is the case, in an authorization request step 112.4, authorization to access the franking machine 102 is requested using an authorization request message ARM transmitted to the data center 103 via a first communication channel.

In response to the authorization request message ARM, in an authorization step 112.5, an authorization message AM is generated at the data center 103 and sent to the franking machine 102 via a second communication channel established between the remote data center 103 and the franking machine 102.

The authorization message AM contains specific authorization data. In the present example, the content of the authorization data is selected as a function of a payment process required for obtaining authorization of access to the franking machine 102. To this end, in a step 112.6 is checked if appropriate payment has been made (e.g. to the vendor of the franking machine 102).

It will be appreciated however that, with other embodiments of the invention, such a payment may not be required to obtain access to the franking machine 102. Furthermore, arbitrary other conditions may be defined, fulfillment of which (alone or in arbitrary combination) provides authorization to access the franking machine 102. Obviously, such a check may also be omitted (as is indicated by the dashed arrow 114).

In the present example, positive authorization data AD(P) are provided within the authorization message AM if a payment transaction (to the specifically required amount) has been confirmed in step 112.6. Otherwise negative authorization AD(N) data are included within the authorization message AM if the payment transaction has not been successfully completed.

In an access activating step 112.7, in response to receipt of the authorization message AM including the authorization data AD(i), enables access to the franking machine 102 for executing a specification process via a third communication channel between the data processing device 105 and the franking machine 102.

To this end, in the access activating step 112.7, in response to receipt of the positive authorization data AD(P), enables access to the franking machine for executing the specification process up to the occurrence of a first event.

In the present example, access of the data processing device 105 to the franking machine 102 is provided via a communication interface (here a USB interface) for establishing the third communication channel. The franking machine, in the access activating step 112.7, in response to the positive authorization data AD(P), simply activates the USB interface for allowing establishment of the third communication channel.

Otherwise, e.g. upon receipt of negative authorization data AD(N), the USB interface of the franking machine is kept inactive. Hence, access to the franking machine may, for example, simply be controlled by the franking machine simply ignoring the communication interface as long as no activation has taken place.

It will be appreciated that, as outlined above, even more sophisticated differentiation may be implemented when activating access to the franking machine 102. For example, in case of the positive authorization data, full and permanent access to the specification process may be granted. Contrary to that, in case of the negative authorization data, limited access to the specification process may be granted and had been outlined above.

In a step 112.8 it is checked if the data processing device 105 initiates access to the franking machine 102. If this is the case, in an access step 112.9, communication between the data processing device and the franking machine is established via the third communication channel using the program code MS executed by the data processing device 105 provided that certain checks have been successfully completed in step 112.9.

In the present embodiment, in the access step 112.9, a program code authentication step and a franking machine authentication step are performed. In the program code authentication step, the franking machine 102 performs an analysis of a program code authentication message PCAM received from the data processing device 105. Here, the franking machine 102 enables access and, hence, subsequent execution of the specification process as a function of a result of the analysis of the program code authentication message PCAM. By this means it may be guaranteed that the franking machine 102 only enables execution of the specification process if a proper program code MS is used within the data processing device 105. Hence, the use of outdated or unauthorized program code may be easily prevented by this means.

Furthermore, in the franking machine authentication step, the data processing device 105 using the program code MS performs an analysis of a franking machine authentication message FMAM received from the franking machine 102, the data processing device 105 enabling access and, hence, subsequent execution of the specification process as a function of a result of the analysis of the franking machine authentication message FMAM. By this means it may be guaranteed that the data processing device only enables execution of the specification process if communication with a properly configured franking machine is established.

It will be appreciated that any desired criteria for the analysis of the respective authentication message PCAM and FMAM may be defined. Preferably, the program code authentication message PCAM comprises an identification of the program code MS, the identification of the program code being representative of at least one of a type of the program code MS, a version identifier of the program code MS, and a unique identifier of the program code MS, an identifier of a first data set, such as a rate table RTPC used by the program code MS. Hence, one or more of these items may be part of the analysis to establish proper configuration of the program code MS suitable for cooperating with the franking machine 102 in its present configuration.

Similarly, preferably, the franking machine authentication message FMAM comprises an identification of the franking machine 102, the identification of the franking machine 102 being representative of at least one of a type of the franking machine 102, an operating system version of the franking machine 102, a unique identifier of the franking machine 102, and an identifier of a second data set used by the franking machine, such as a rate table RTFM. Hence, here as well, one or more of these items may be part of the analysis to establish proper configuration of the franking machine 102 suitable for cooperating with the program code in its present configuration.

It will be appreciated, for example, that it may be checked in this context, if the appropriate, most recent version of the program code MS is present in the data processing device 105 which matches the actual software configuration of the franking machine 102 and vice versa. Furthermore, if postal services are performed requiring the use of postal information such as rate tables or the like, it can be established if both the data processing device and the franking machine hold the same valid or applicable rate table, i.e. that rate table RTFM matches rate table RTPC.

It will be appreciated that, in any case of a mismatch, the communication partner identified as holding inappropriate data may be triggered or even forced to obtain an update of these data. Hence, particularly stable configurations may be achieved using compatible and/or continuously updated data on both the data processing device 105 and the franking machine 102.

It will be appreciated that in the present embodiment, the program code authentication step and the franking machine authentication step is performed at the occurrence of at least one predetermined event that has been outlined above. The present case, the predetermined event is the occurrence of each access step 112.9. Hence, with each access step 112.9 the program code authentication step and the franking machine authentication step is performed, such that process insecurity due to software incompatibility is reduced to a minimum.

In a step one with 112.10 is checked if a service of the franking machine is to be specified in the sense of the present invention. If this is the case, in a specification step 112.11 the specification process is executed using the program code MS executed by the data processing device 105. In the course of this specification process at least one feature of at least one service provided by the franking machine 102 is set.

It will be appreciated that any type of service may be set, configured or modified according to arbitrary criteria. In the present example, functionality of the franking machine 102 is expanded beyond what is available using a user interface of the franking machine 102. By this means, functionality of the whole system 101 may be greatly expanded and rendered more variable, respectively.

The service S specified with the method according to the invention may be a service immediately providing at the franking machine 102 the result of a desired action initiated by the user of the data processing device. For example, it may be the printing of an indicium onto a substrate, such as a letter using the printing device of the franking machine 102.

It will also be the case, in a service executing step, the data processing device 105 (when executing the program code MS) executes a further service SPC, for example, requested by the user of the data processing device 105 entering corresponding request data when running a specific request routine of the program code MS. Executing the further service SPC then comprises requesting the service S in step 112.11 from the franking machine 102. Hence, functionality of the franking machine 102 may be further expanded to further services where the service provided by the franking machine 102 represents only a part of the further service or a contribution to the further service executed by the data processing device As mentioned, any type of service (the franking machine is able to provide) may be the object of the specification process. Preferably, executing the specification process using the program code executed by the data processing device comprises setting at least one feature of at least one service S provided by the franking machine selected from a specific service group.

Such a service may for example be providing input data for a franking product selection process executed using the program code MS. Hence, selection of the desired franking product may be executed on the basis of data provided by the franking machine 102 to the data processing device 105.

A further service S may be providing input data for a logging process executed using the program code MS. Hence, logging and/or statistics functionality may be implemented in the program code MS executed by the data processing device 105, this logging and/or statistics functionality receiving relevant input data (relating to services performed by the franking machine 102) from the franking machine 102 in the course or as a result of this service S.

A further service S may be providing input data for a reporting process executed using the program code MS. Hence, reporting functionality may be implemented in the program code MS executed by the data processing device 105, this reporting functionality receiving relevant input data (relating to services performed by the franking machine 102) from the franking machine 102 in the course or as a result of this service S.

Provision of such reporting data to a remote facility, such as the remote data center 103 or a further carrier data center 108 may be the basis for specific discounts in generating a postal indicium. Hence, functionality of the franking system 101 and, moreover, benefit of the use of such a franking system 101 to both the postal carrier and the user of the franking system may be easily enhanced.

A further service S may be receiving output data of a franking product selection process executed using the program code MS. Hence, for example, the franking product selection process may be performed in a more convenient or flexible way using the data processing device 105, the service executed S by the franking machine then receiving corresponding input data and, for example, in response to receipt of these input data generating a franking imprint.

A further service S may be printing an image onto a substrate, the image including at least one of graphics, human readable text and machine readable information. With such a service is possible, for example, to modify at least parts of the image to be printed using the external data processing device 105. For example, the external data processing 105 device may be used to modify information content of the image printed, such as by (arbitrarily) editing a human readable text string SMS printed in the image.

A further service S may be outputting printing information for a printing process executed using printing device 106 under the control of the program code MS. Hence, for example, it is possible to provide a service S that generates at least part of the printing information necessary in generating printed indicium 111 using printer 106 connected to the data processing device 105 (instead of the printer module of the franking machine).

Preferably, the printing information outputted by the franking machine 102 comprises security or accounting relevant data. Preferably, at least part of the printing information up at the by the franking machine is secured using the security features of a security device 104 of the franking machine 102. The security device 104, in the present case, provides security features including the use of cryptographic means (such as generation of message authentication codes, data encryption, generation of digital signatures, generation of digital certificates etc.).

Here again, it is possible to expand the functionality of the franking system 101 by providing more convenient printing functionality, in particular printing functionality easily able to print larger images or printing with conventional ink or toner compared to printing modules used in franking machines 102 (typically also requiring specific postal ink).

A further service S may be generating accounting information AI for a printing process executed using the program code MS (executed on the data processing device 105) and/or the franking machine 102. Hence, with the present invention it is possible to switch from a conventional postage payment system to a more enhanced postage payment system providing specific discounts to the user under certain predefined prerequisites.

A further service S may be generating accounting information AI for execution of a further service using the program code MS (executed on the data processing device 105) and/or the franking machine 102. Hence, it is also possible to expand accounting facilities of the franking machine to the execution of further services (other than accounting for the generation of indicium data).

A further service S may be triggering execution of a further service by the franking machine 102. Hence, it is also possible, for example, to specify a service initiating communication of the franking machine 102 with a remote facility (e.g. the remote data center 103 or carrier data center 108). Such a service may, for example, be a service S requesting refill of accounting registers of a security device 104 of the franking machine 102, a service requesting a software update or firmware update for the franking machine 102, a service sending diagnosis data (representing a status of one or more components of the franking machine 102) of the franking machine 102 to the remote facility 103, 108, respectively.

Finally, a further service S may be configuring operation of the franking machine 102. Hence, it is also possible, for example, to specify a service providing IP settings, an accounting administration service providing setup and/or modification of accounting related user accounts (e.g. administration of individual budgets, user accounts, account limit warnings etc.), a service providing user interface administration (e.g. programming of softkeys, defining bookmarks, modifying menu structure or menu sequence etc.).

As outlined above, arbitrary features of the respective service S may be set in the specification process. A feature may be setting or defining an accessibility of the service S to the data processing device 105 executing the program code MS. Hence, in the simplest case, setting the feature in the specification process simply defines if the respective service S is available or accessible, respectively, to the data processing device 105 at all.

A further feature is an information content of the service S. Hence, for example, specific messages or content input or output in the course of this service may be modified. As a consequence, for example, a text string output SMS (e.g. printed in an indicium) may be edited and modified, respectively, in the course of the specification process.

Further features are a number of service steps of the service S, a combination of service steps of the service S and a sequence of service steps of the service S. By this means, the combination of certain service steps as well as their sequence within the service S may be readily modified according to the invention. Finally, a further feature is a scope of at least one service step of the service S. Hence, the specific outcome of the service S may be modified.

After specification step 112.11 has been completed, the routine jumps back to step 112.10. If no further specification is to be executed, the routine jumps to step 112.12, where it is checked if the routine is to be stopped. If this is the case, the routine ends in a step 112.13. Otherwise, the routine jumps back to step 112.3, wherein a check is made if another authorization request is received.

It will be appreciated that one single level of security may be provided, i.e. that only one level of authorization is selected. However, in the present example, different levels of authorization and security, respectively, are implemented.

Hence, for example, on a lower level of security or authorization, respectively, specification of certain non or less security relevant first services S1 (among services S as outlined above) may be provided, while specification of more security critical second services S2 (among services S as outlined above) may be enabled only if a higher level of security or authorization, respectively, has been established.

Thus, in the present example, in a further execution of authorization request step 112.4, authorization to access at least one second service S2 of the franking machine 102 is requested using a second authorization request message ARM2. In a second authorization step 112.5, in response to the second authorization request message ARM2, via the second communication channel second authorization data AD2 is provided from the remote data center 103 to the franking machine 102.

In the present example, in the second round of the authorization step 112.5, in response to the second authorization request message ARM2, the remote data center provides a first secret SEC1 to the data processing device 105 and a second secret SEC2 to the franking machine 102.

The franking machine 102, in the second round of the access step 112.9, receives a second authorization message AM2 from the data processing device 105, the second authorization message AM2 comprising the first secret SEC1. The franking machine 102, in the second round of the access step 112.9, performs a check using the second authorization message AM2. Furthermore, the franking machine, in response to a result of the check using the second authorization message AM2, enables execution of the second specification process only if a predetermined relationship exists between the first secret SEC1 received from the data processing device 100 point and the second secret SEC2 received from the remote data center 103. By this means it is possible to implement, in a very simple way, a higher security level using the communication of both parties (data processing device and franking machine) with the remote data center.

It will be appreciated here as well, that providing the first and second secret SEC1, SEC2 may ensue by any suitable communication channel. In particular, again, the first and second communication channels as outlined above may be used.

It will be further appreciated that, as mentioned, such an approach will preferably be taken in cases where accounting and/or secure data generation services provided by the franking machine 102 (more precisely the security device 104 of the franking machine 102) are used as parts a further service performed using the program code MS executed by the data processing device 105.

The first and second secret SEC1, SEC2 may be of any desired type. In any case they are of sufficient length to prevent easy compromise of the respective secret. Preferably, the first secret comprises at least one secret component, the secret component being constant secret data CSEC and user secret data USEC unique to a specific user of the data processing device initiating the authorization request step. By this means, using the constant secret data CSEC secrets for a specific class of data processing devices franking machines etc. may be set up. Moreover, using the user specific user secret data USEC, individual and unique secrets for each user may be set up.

The first and second secret SEC1, SEC2 may be used in any desired way to provide enhanced security of arbitrary parts of the method. Preferably, the data processing device 105 and the franking machine 102, in the access step 112.9, establish a shared secret SSEC using at least one of the first secret and the second secret SEC1, SEC2. The shared secret SSEC then is used to cryptographically secure communication between the data processing device 105 and the franking machine 102 via the third communication channel (i.e. the USB connection). By this means, fraudulent attacks to the communication between the data processing device 105 and the franking machine 102 may be effectively prevented.

As mentioned above, arbitrary parts of the service S may be configured or modified in the specification process. Preferably, in the specification step, executing the specification process using the program code MS executed by the data processing device 105 comprises modification of the at least one service from a first service variant SV1 to a second service variant SV2, the first service variant SV1 being enabled prior to executing the specification process, the second service variant SV2 being enabled after executing the specification process. By this means it is possible, for example, to simply switch between or activate certain variants of a service S implemented within the franking machine 102.

Such a switch may be used for arbitrary services. Preferably, the service provided by the franking machine comprises an accounting service AS, the accounting service AS, in the first service variant ASV1, providing different accounting for execution of the service AS than in the second service variant ASV2. Hence, for example, a switch between variants of the accounting service AS providing different discounts to a user of the system may be achieved in a very simple manner.

In the present embodiment, a security relevant service S2 provided by the franking machine 102 comprises a service outputting printing information PI for a printing process executed using (more precisely under the control of) the program code MS, the data processing device 105, using the program code MS, then causing generation of an imprint 111 a substrate such as a shipping label 113 via printing device 106 connected to the data processing device 105. By this means it is possible to expand in a secure way printing functionality of the system to print images which may not be printed using the printing module of the franking machine. For example, as outlined above, this configuration may be used for printing Commercial Base Pricing (CBP) indicia 111 (this process also including sending corresponding CBP data to the postal carrier, such as e.g. the United States Postal Service, e.g. to be carrier data center 108).

In the present case, the printing information PI comprises postal indicium data PID, the postal indicium data PID being generated as a part of the service S2 by the security device 104 of the franking machine 100 to in response to indicium request data IRD received from the data processing device 105 executing the program code MS.

At least a part of the postal indicium data PID is secured by the security device 104 of the franking machine 102 using cryptographic means selected from a cryptographic means group, the cryptographic means group consisting of use of encryption, use of a digital signature and use of a message authentication code and use of a digital certificate.

Furthermore, the service S2 provided by the franking machine 102 comprises an accounting service AS accounting for outputting the printing information PI, the accounting service AS being executed by the security device 104 of the franking machine 102.

It will be appreciated that, in the present example as well, any desired and suitable type of communication channel may be used. Preferably, communication providing a sufficiently high level of data security and data integrity is used. Preferably, communication over at least one of the first communication channel (between user and/or data processing device 105 and remote data center 103), the second communication channel (between remote data center 103 and franking machine 102) and the third communication channel (between franking machine 102 and data processing device 105) is secured by cryptographic means selected from a cryptographic means including use of encryption, use of a digital signature, use of a digital certificate and use of a message authentication code.

It will be appreciated that, in the present example, the respective authorization request message ARM may be generated and conveyed to the remote data center 103 by any suitable means. For example, it may be contained in a simple letter or handwritten form sent by ordinary mail to the operator of the data center, the request message than being transferred from the letter to the data center.

With certain embodiments of the invention, the authorization request message ARM is generated using the program code MS executed by the data processing device 105. Then, in the authorization request step 112.4, a first communication channel is established via a communication link between the data processing device 105 and the remote data center 103, the authorization request message ARM being transmitted to the data center 103 via the communication link.

Similar applies with further embodiments of the invention using the first and second secrets SEC1, SEC2, where in the authorization step 112.5, the first communication channel is established via a communication link between the data processing device 105 and the remote data center 103, the first secret SEC1 then being provided to the data processing device 105 via the first communication link.

It will be appreciated that the indicium 111 may comprise a representation of the indicium data IND in any suitable form allowing later retrieval and, eventually, further verification of the indicium data IND (e.g. during shipment of the mail piece 110 by the carrier). Preferably, the data processing device 105 generates print data PD and sends the print data PD to the printing device 106, the print data PD comprising data for a machine readable representation of the indicium data IND. Any type of machine readable representation may be used. Preferably, the data for the machine readable representation comprise two-dimensional barcode data to generate a two-dimensional barcode 111.2. Furthermore, the indicium may also comprise clear human readable text as indicated by the contour 111.3

It will be further appreciated that the printing device printing the indicium 111 does not necessarily have to be a separate printing device 106. For example, with certain embodiments of the invention, a printing device of the first franking machine 102 may also be used as the printing device printing at least parts of the indicium 111.

The present invention was described in the foregoing using an example wherein an indicium 111 is printed on a label 113 to be associated (e.g. physically connected) to the mail piece 110. It will be appreciated however that, with other embodiments of the invention, the indicium may also be printed directly onto the mail piece.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for specifying services provided by a franking machine cooperatively operating with a data processing device and a remote data center, comprising,
  in a program code loading step, loading a program code into a data processing device;

in an authorization request step, establishing a first communication channel between said data processing device and a remote data center, and, via said first communication channel, transmitting an authorization request message from the data processing device to the remote data center to request authorization from the data center to access said franking machine by said data processing device;

in an authorization step, in response to said authorization request message, establishing a second communication channel between said remote data center and said franking machine, and providing authorization data from said remote data center to said franking machine via said second communication channel;

in an access activating step, in response to receipt of said authorization data by said franking machine, enabling access to said franking machine by said data processing device via a third communication channel between said data processing device and said franking machine;

in an access step, establishing communication between said data processing device and said franking machine via said third communication channel using said program code executed by said data processing device; and in a specification step, executing said program code in said data processing device to generate electrical control commands for said specification process and transmitting said control commands to said franking machine via said third communication channel, and, at said franking machine, executing said specification process according to said control commands to set, at said franking machine, at least one feature of at least one service provided by said franking machine, and thereby configuring said franking machine to provide said at least one feature of said at least one service.

2. The method according to claim 1, wherein
said franking machine has a user interface for controlling operation of said franking machine; and
said specification process being unavailable using said user interface of said franking machine.

3. The method according to claim 1, wherein
in a service executing step, said data processing device executing said program code executes a further service; and
said executing said further service comprises requesting said service from said franking machine.

4. The method according to claim 1, wherein
executing said specification process using said program code executed by said data processing device comprises setting at least one feature of at least one service provided by said franking machine selected from a service group; and
said service group comprising
a first service providing input data for a franking product selection process executed using said program code,
a second service providing input data for a logging process executed using said program code,
a third service providing input data for a reporting process executed using said program code,
a fourth service receiving output data of a franking product selection process executed using said program code,
a fifth service printing an image onto a substrate, said image including at least one of graphics, human readable text and machine readable information,
a sixth service outputting printing information for a printing process executed using said program code,
a seventh service generating accounting information for a printing process executed using at least one of said program code and said franking machine,
an eighth service generating accounting information for execution of a further service using at least one of said program code and said franking machine,
a ninth service triggering execution of a further service by said franking machine, and
a tenth service configuring operation of said franking machine.

5. The method according to claim 1, wherein
executing said specification process using said program code executed by said data processing device comprises setting at least one feature of at least one service provided by said franking machine selected from a feature group;
said feature group comprising
an accessibility of said service to said data processing device executing said program code,
an information content of said service,
a number of service steps of said service,
a combination of service steps of said service,
a sequence of service steps of said service, and
a scope of at least one service step of said service.

6. The method according to claim 1, wherein
in said authorization step, said remote data center provides one of positive authorization data and negative authorization data to said franking machine;
said positive authorization data being provided if a payment transaction representing payment for executing said authorization step has been successfully completed;
said negative authorization data being provided if said payment transaction has not been successfully completed;
said franking machine, in said access activating step, in response to receipt of said positive authorization data, enabling access to said franking machine for executing said specification process up to the occurrence of a first event;
said franking machine, in said access activating step, in response to receipt of said negative authorization data, one of keeping access disabled and enabling access to said franking machine for executing said specification process up to the occurrence of a second event;
said second event being different from said first event;
said first event being one of a temporal and non-temporal event; and
said second event being one of a temporal and a non-temporal event.

7. The method according to claim 1, wherein
said franking machine has a communication interface for establishing said third communication channel; and
said franking machine, in said access activating step, activating said communication interface for establishing said third communication channel if said authorization data have a predetermined content, otherwise keeping said communication interface inactive.

8. The method according to claim 1, wherein
in said authorization step, in response to said authorization request message, said remote data center, in particular via said first communication channel, provides a first secret to said data processing device and said remote data center, via said second communication channel, provides a second secret to said franking machine;
said franking machine, in said access step, receiving an authorization message from said data processing device executing said program code, said authorization message comprising said first secret;
said franking machine, in said access step, performing a check using said authorization message; and
said franking machine, in response to a result of said check using said authorization message, enabling execution of said specification process only if a predetermined relationship exists between said first secret and said second secret.

9. The method according to claim 8, wherein
said first secret comprises at least one secret component selected from a secret component group; and
said secret component group consisting of constant secret data, user secret data unique to a specific user of said data processing device initiating said authorization request step.

10. The method according to claim 8, wherein
said data processing device and said franking machine, in said access step, establish a shared secret using at least one of said first secret and said second secret; and
said shared secret being used to cryptographically secure communication between said data processing device and said franking machine via said third communication channel.

11. The method according to claim 8, wherein
in said specification step, executing said specification process using said program code executed by said data processing device comprises modification of said at least one service from a first service variant to a second service variant; and
said first service variant being enabled prior to executing said specification process, said second service variant being enabled after executing said specification process.

12. The method according to claim 11, wherein
said service provided by said franking machine comprises an accounting service; and
said accounting service, in said first service variant, providing different accounting for execution of said service than in said second service variant.

13. The method according to claim 8, wherein
said service provided by said franking machine comprises a service providing an output printing information for a printing process executed using said program code; and
said data processing device, using said program code, causing generation of an imprint on a substrate via a printing device connected to said data processing device.

14. The method according to claim 13, wherein,
said printing information comprises postal indicium data; and
said postal indicium data being generated as a part of said service by a security device of said franking machine in response to indicium request data received from said data processing device executing said program code.

15. The method according to claim 13, wherein,
at least a part of said postal indicium data being secured by said security device of said franking machine using cryptographic means selected from a cryptographic means group; and
said cryptographic means group consisting of use of encryption, use of a digital signature and use of a message authentication code, and use of a digital certificate.

16. The method according to claim 13, wherein,
said service provided by said franking machine comprises an accounting service accounting for outputting said printing information; and
said accounting service being executed by a security device of said franking machine.

17. The method according to claim 1, wherein
in said access step, at least one of a program code authentication step and a franking machine authentication step is performed;
in said program code authentication step, said franking machine performing an analysis of a program code authentication message received from said data processing device; said franking machine enabling execution of said specification process as a function of a result of said analysis of said program code authentication message; and
in said franking machine authentication step, said data processing device using said program code performing an analysis of a franking machine authentication message received from said franking machine; said data processing device enabling execution of said specification process as a function of a result of said analysis of said franking machine authentication message.

18. The method according to claim 17, wherein
said program code authentication message comprises an identification of said program code, said identification of said program code being representative of at least one of a type of said program code, a version identifier of said program code, and a unique identifier of said program code, an identifier of a first data set used by said program code;
said franking machine authentication message comprises an identification of said franking machine, said identification of said franking machine being representative of at least one of a type of said franking machine, an operating system version of said franking machine, a unique identifier of said franking machine, and an identifier of a second data set used by said program code.

19. The method according to claim 17, wherein
at least one of said program code authentication step and said franking machine authentication step is performed at the occurrence of at least one predetermined event selected from an event group;
said event group consisting of the occurrence of a predetermined temporal event, the occurrence of a predetermined non-temporal event, the occurrence of an n-th execution of said access step, the occurrence of a predetermined point in time, the lapse of a predetermined time interval from the last occurrence of an event of said event group.

20. The method according to claim 1, wherein
said authorization step is a first authorization step, said authorization data being first authorization data, and said specification step is a first specification step, said specification process being a first specification process;
said franking machine, in said access activating step, in response to receipt of said first authorization data provided in said first authorization step, enabling access to said franking machine for executing said first specification process;
said first specification process executed in said first specification step enabling execution of at least one first service requested by said data processing device executing said program code from said franking machine;
in a further authorization request step, via said first communication channel between said data processing device and said remote data center, requesting authorization to access at least one second service of said franking machine using a second authorization request message generated using said program code executed by said data processing device;

in a second authorization step, in response to said second authorization request message, via said second communication channel providing second authorization data from said remote data center to said franking machine;

said franking machine, in a second access activating step, in response to receipt of said second authorization data, enabling access to said franking machine for executing a second specification process via said third communication channel; and in a second specification step, executing said second specification process using said program code executed by said data processing device, said second specification process setting at least one feature of at least one second service provided by said franking machine.

21. The method according to claim 20, wherein in said second authorization step, in response to said second authorization request message, said remote data center provides a first secret to said data processing device and a second secret to said franking machine;

said franking machine, in said second access step, receiving a second authorization message from said data processing device executing said program code, said second authorization message comprising said first secret;

said franking machine, in second access step, performing a check using said second authorization message; and said franking machine, in response to a result of said check using said second authorization message, enabling execution of said second specification process only if a predetermined relationship exists between said first secret and said second secret.

22. The method according to claim 1, wherein communication over at least one of said first communication channel, said second communication channel and said third communication channel is secured by cryptographic means selected from a cryptographic means group; and said cryptographic means group consisting of use of encryption, use of a digital signature and use of a message authentication code.

23. The method according to claim 1, wherein at least one of said first communication channel and said second communication channel is established via a data network; and said third communication channel is at least one of a point-to-point communication channel and a USB link.

24. The method according to claim 1, wherein said authorization request message is generated using said program code executed by said data processing device; and in said authorization request step, establishing said first communication channel via a communication link between said data processing device and said remote data center and sending said authorization request message via said communication link.

25. The method according to claim 8, wherein in said authorization step, said first communication channel is established via a communication link between said data processing device and said remote data center; and said first secret being provided to said data processing device via said first communication channel.

26. A data processing arrangement adapted to execute a method for specifying services provided by a franking machine, comprising, a data processing device, a franking machine and a remote data center;

said data processing device being configured to load, in a program code loading step, a program code;

said data processing device being configured to establish, in an authorization request step, a first communication channel between said data processing device and a remote data center, and to transmit an authorization request message via said first communication channel to said data center that requests the data center to provide authorization to access said franking machine by the data processing device;

said remote data center being configured to provide, in an authorization step, in response to said authorization request message, to establish a second communication channel between said remote data center and said franking machine, and to provide authorization data from said remote data center to said franking machine via said second communication channel;

said franking machine being configured to enable, in an access activating step, in response to receipt of said authorization data by said franking machine, access to said franking machine by said data processing device via a third communication channel between said data processing device and said franking machine;

said data processing device and said franking machine being configured to establish, in an access step, communication between said data processing device and said franking machine via said third communication channel using said program code executed by said data processing device; and said data processing device being configured, in a specification step, to execute said program code to generate electrical control commands for said specification process and transmitting said control commands to said franking machine via said third communication channel, and, at said franking machine being configured to execute said specification process specification process according to said control commands to set, at said franking machine, at least one feature of at least one service provided by said franking machine and thereby place said franking machine in a configured state to provide said at least one feature of said at least one service.

27. A non-transitory, computer-readable data storage medium encoded with programming instructions, said data storage medium being distributed among a data processing device, a franking machine and a remote data center cooperatively operating in a mail processing system, and said programming instructions causing said data processing device, said franking machine and said remote data center, respectively, to:

in a program code load step, receive program code into said data processing device;

in an authorization request step, establish a first communication channel between said data processing device and a remote data center, transmitting an authorization request message from the data processing device to the remote data center to request request authorization from the data center to access said franking machine by said data processing device;

in an authorization step, in response to said authorization request message, establish a second communication channel between said remote data center and said franking machine, and provide authorization data from said remote data center to said franking machine via said second communication channel;

in an access activating step, in response to receipt of said authorization data, enable access to said franking machine by said data processing device via a third communication channel between said data processing device and said franking machine;

in an access step, establish communication between said data processing device and said franking machine via said third communication channel using said program code executed by said data processing device; and in a specification step, execute said program code in said data processing device to generate electrical control commands for said specification process and transmitting said control commands to said franking machine via said third communication channel, and, in said franking machine, to execute, said specification process according to said control commands to set, in said franking machine, at least one feature of at least one service provided by said franking machine and thereby place said franking machine in a configured state to provide said at least one feature of said at least one service.

* * * * *